(12) United States Patent
West

(10) Patent No.: US 11,506,750 B2
(45) Date of Patent: Nov. 22, 2022

(54) TIME DIVISION MULTIPLEXED MONOPULSE AESA COMPARATOR NETWORK

(71) Applicant: Rockwell Collins, Inc., Cedar Rapids, IA (US)

(72) Inventor: James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/019,791

(22) Filed: Sep. 14, 2020

(65) Prior Publication Data

US 2022/0082656 A1 Mar. 17, 2022

(51) Int. Cl.
- *G01S 7/28* (2006.01)
- *G01S 13/44* (2006.01)
- *H01Q 3/38* (2006.01)

(52) U.S. Cl.
CPC ........ *G01S 7/2813* (2013.01); *G01S 13/4463* (2013.01); *H01Q 3/385* (2013.01)

(58) Field of Classification Search
None
See application file for complete search history.

(56) References Cited

U.S. PATENT DOCUMENTS

| | | | |
|---|---|---|---|
| 3,392,395 A | 7/1968 | Hannan | |
| 8,427,371 B2 | 4/2013 | Pozgay | |
| 8,988,277 B2 | 3/2015 | Leise et al. | |
| 9,110,170 B1 | 8/2015 | Woollard et al. | |
| 9,128,189 B1 | 9/2015 | West et al. | |
| 9,225,073 B2 | 12/2015 | Culkin et al. | |
| 9,891,310 B2 | 2/2018 | Chang et al. | |
| 10,594,031 B1 | 3/2020 | West et al. | |
| 2003/0117314 A1* | 6/2003 | Yu | G01S 13/449 342/162 |

OTHER PUBLICATIONS

Extended Search Report in European Application No. 21196626.2, dated Feb. 8, 2022, 10 pages.

Farina Alfonso: "Chapter 24: Electronic Counter—Countermeasures" In: "Radar Handbook", Jan. 1, 2008 (Jan. 1, 2008), McGraw Hill, USA, XP055884809, ISBN: 978-0-07-148547-0.

Nickel U: "Overview of generalized monopulse estimation", IEEE Aerospace and Electronic Systems Magazine, IEEE Service Center, Piscataway, NJ, US, vol. 20, No. 6, Jun. 1, 2006 (Jun. 1, 2006), pp. 27-56, XP011244552, ISSN: 0885-8985.

* cited by examiner

*Primary Examiner* — Whitney Moore
(74) *Attorney, Agent, or Firm* — Suiter Swantz pc llo

(57) ABSTRACT

A dual or quad aperture radar array switches between states in between radiation cycles to acquire both sum and difference beams. The beams are then processed together to produce a central lobe enhanced beam and a side lobe enhanced beam via difference computations. During interleaved cycles, beams may be processed by Taylor weighting, split Taylor weighting, or Bayliss weighting. Multiple sets of switching cycles may be processed together to refine results.

15 Claims, 9 Drawing Sheets

2D Synthetic MPAC Architecture

TIME DIVISION MULTIPLEXED MONOPULSE AESA COMPARATOR NETWORK

BACKGROUND

State-of-the-Art tracking and obstacle detection techniques utilize monopulse antenna systems, including active electronically scanned array (AESA)—based radars. Such monopulse AESAs feature a three-channel monopole comparator to realize three different beams simultaneously; a sum beam, a difference azimuth beam, and a difference elevation beam.

A monopulse comparator synthetically sharpens the effective beam width by up to a factor of forty, by comparing the sum beam and difference beams. The synthetic beam width is up to forty times narrower than the physical beam width of the aperture.

Existing, sophisticated radar systems have parallel banks of beam formers simultaneously optimizing the beams for sum weightings and difference weightings such that differently optimized beams run in parallel to realize those three simultaneous beams. Such architecture requires extra complexity in driving circuitry and power dissipation. It would be desirable to have a radar system that performed sum and difference beam analysis without such added complexity.

SUMMARY

In one aspect, embodiments of the inventive concepts disclosed herein are directed to a dual or quad aperture radar array that switches between states in between radiation cycles to acquire both sum and difference beams. The beams are then processed together.

In a further aspect, during interleaved cycles, beams may be processed by Taylor weighting, split Taylor weighting, or Bayliss weighting. In a further aspect, multiple sets of switching cycles may be processed together to refine results.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
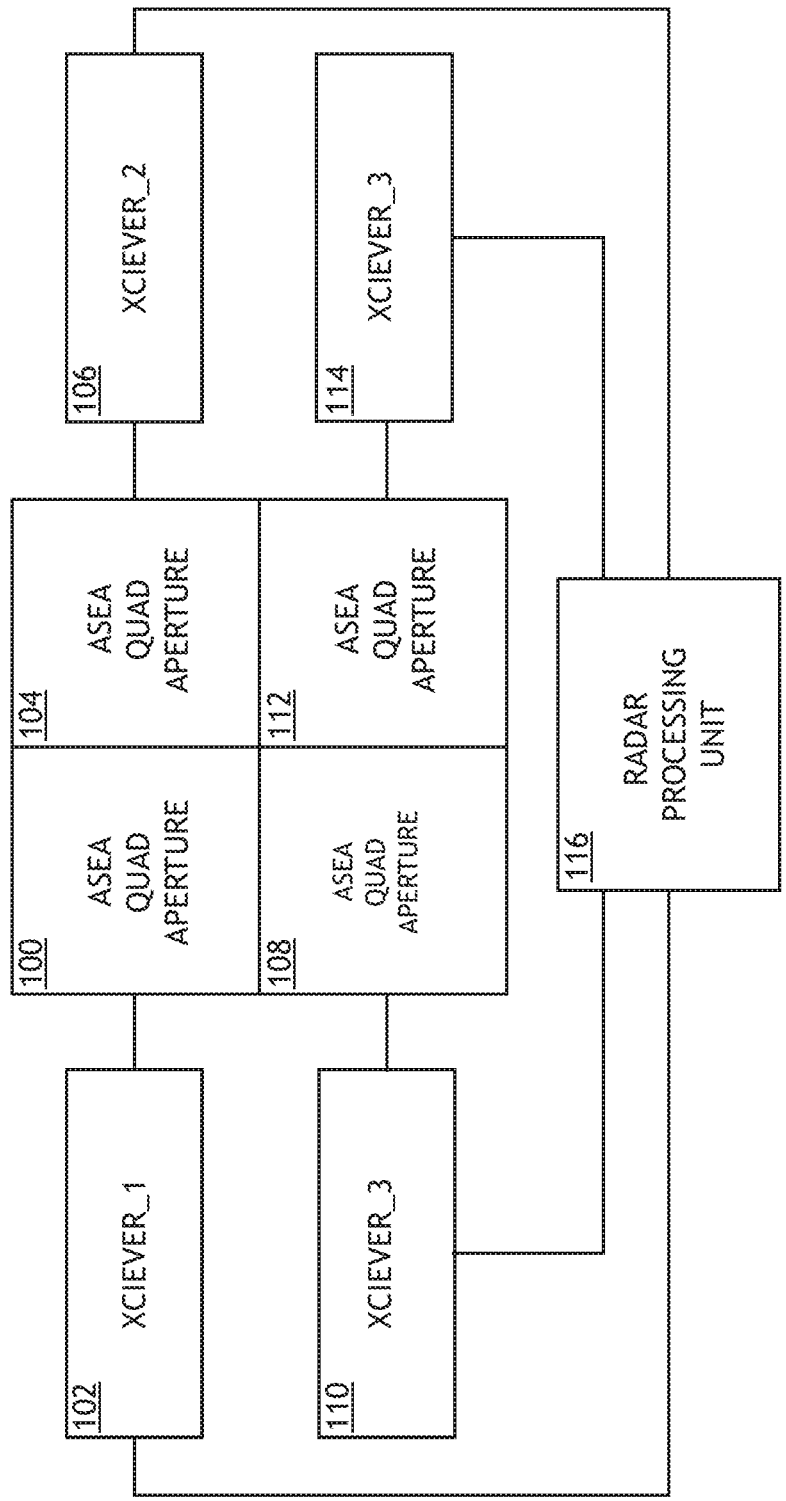
FIG. 1 shows a block diagram of a radar system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a dual or quad aperture radar array that switches between states in between radiation cycles to acquire both sum and difference beams. The sum and difference beam can each be independently optimized as required. The beams are then processed together. During interleaved cycles, beams may be processed by Taylor weighting, split Taylor weighting, Bayliss weighting, or any other far field patterns produced through array pattern synthesis, numerical optimization of the aperture excitations for sum and difference beams, to created symmetric patterns, create low side lobes across specific angular regions, or drive nulls in the far field radiation patterns, etc. Multiple sets of switching cycles may be processed together to refine results. Embodiments described herein emphasize Taylor sum and Bayless difference patterns as these have been the historical patterns of choice for optimal monopulse operation, but it may be appreciated that other patterns are envisioned.

Referring to FIG. 1, a block diagram of a quad-aperture radar system according to an exemplary embodiment utilizing 2D quadrant based monopulse architecture is shown. The radar system includes an array divided into four apertures 100, 104, 108, 112. Each aperture 100, 104, 108, 112 may comprise an active electronically scanned array driven by corresponding drive circuitry, and each associated with a transceiver 102, 106, 110, 114 for sending and receiving signals to the corresponding aperture 100, 104, 108, 112.

A radar processing unit 116 determines and applies signals to each of the transceivers 102, 106, 110, 114 to configure each corresponding aperture 100, 104, 108, 112 to produce an active electronically scanned beam. During a first cycle, the radar processing unit 116 produces signals to configure the apertures 100, 104, 108, 112 to produce a combined signal optimized for a sum beam such as a Taylor sum. The configured apertures 100, 104, 108, 112 receive a first return signal with required phase sift for sub-optimal delta azimuth and delta elevation beams added in the down converter quadrant level digital sampled returns, via digital signal processing. Then, during a second cycle, the radar processing unit 116 produces signals to configure the apertures 100, 104, 108, 112 to produce a combined signal that is optimized fora difference beam, such as a Bayless difference, of each individual aperture signal. The configured apertures 100, 104, 108, 112 receive a second return signal with optimal delta azimuth and delta elevation return, but sub-optimal sum beam return. In at least one embodiment, the radar processing unit 116 determines if a signal-to-clutter ratio is adequate to discriminate a target of interest within the specific radar clutter scenario.

In at least one embodiment, during a first pulse cycle, a Tayler sum beam and a Taylor delta beam are processed in 2D monopulse mode, real-time, using digitally synchronized I/Q returns from a single or monopulse configuration. Amplitude settings of each radiating element are held fixed in a single channel analog beamformer residing within each quadrant subarray. If performance criteria are inadequate, the radar then reconfigures the apertures 100, 104, 108, 112 into Synthetic MPC Mode.

Ina following radar pulse, the apertures 100, 104, 108, 112 are reconfigured for an optimized delta azimuth beam and delta elevation beam with a desired receive side lobe level. Furthermore, the apertures 100, 104, 108, 112 are reconfigured for a delta azimuth and elevation beam during the transit pulse's frame duration.

The radar processing unit compares the azimuth and elevation difference beam against a sum beam to determine a precision angular resolution more than may be physically possible with a common aperture. Implementing embodiments with a quad-aperture 100, 104, 108, 112 array allows a single set of phase shifters and amplifiers on every radiating element without parallel banks of feeds.

In at least one embodiment, the radar processing unit 116 may record past pulses and perform coherent integration on multiple pulses to improve signal-to-noise ratios.

Figure 2:
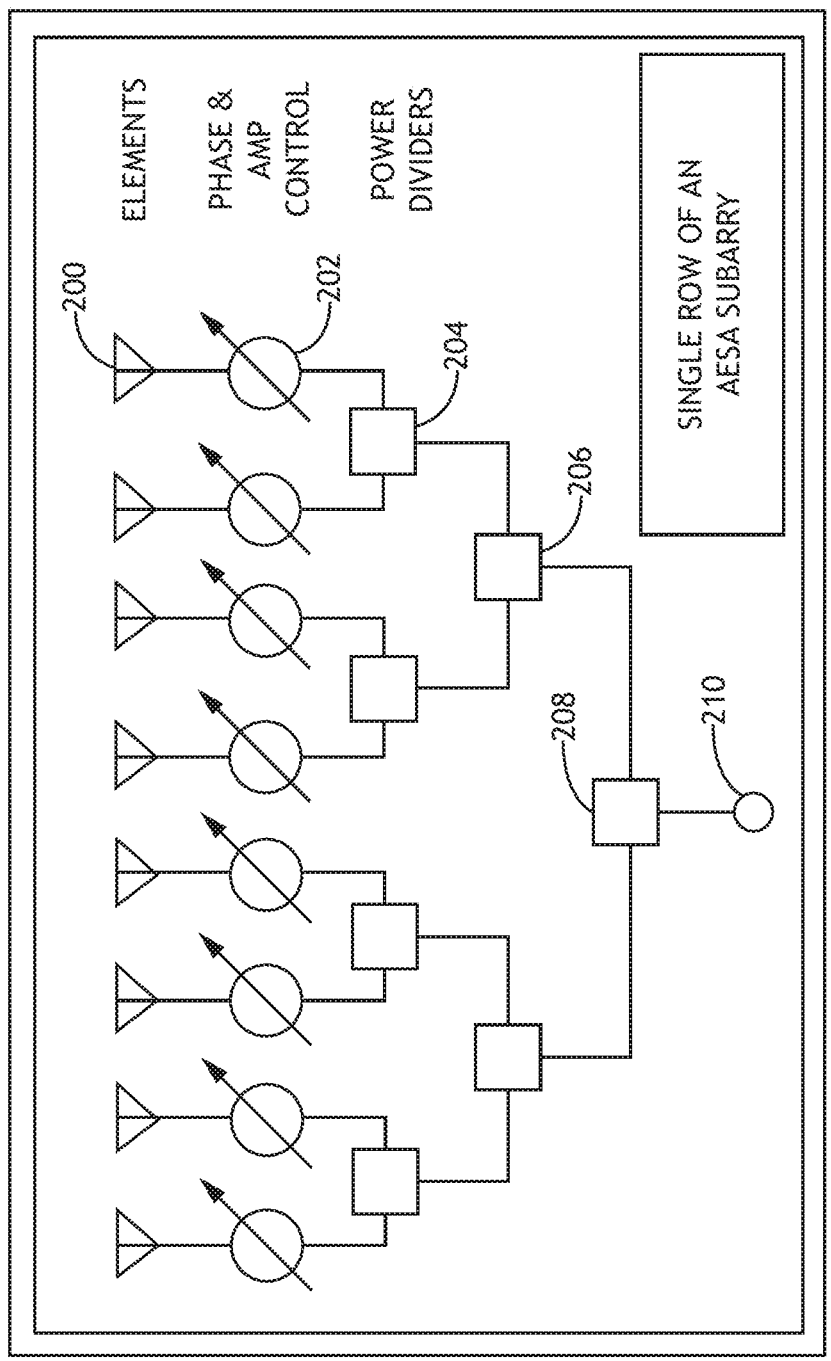
FIG. 2 shows a block diagram of an antenna according to an exemplary embodiment.

Referring to FIG. 2, a block diagram of an antenna according to an exemplary embodiment is shown. Each actively electronically scanned array useful for implementing exemplary embodiments comprises a plurality of radiating elements 200, each driven by a phase and amplitude control element such as a variable gain amplifier and phase shifter 202. Signals to each radiating element 200 may originate from a transceiver via an I/O port 210 and travel through a series of combiners/splitters 204, 206, 208. A one-dimensional ESA antenna is shown here for conceptual simplicity. The concepts described herein are generally applicable to two-dimensional and three-dimensional monopulse ESAs Phased array antennas require accurate phase shift for beam pointing. Furthermore, phased array antennas also require amplitude taper and high phase precision for low side lobe levels. Precision aperture phase and amplitude control is required for high performance electronically scanned arrays, including a flat, analog-like phase with low error. Low side lobe level operation requires an analog-like amplitude taper with tens of dBs of dynamic range across the array aperture with a tight phase response.

In at least one embodiment, amplitude weighting is applied by means of a plurality of variable gain amplifiers and phase shifters 202 and/or passive attenuators in a feed manifold that set the summated transmission beam or receive beam, and the delta azimuth and elevation beam by simultaneously exciting the required amplitude tapering to realize desired side lobe levels. Traditionally, all four monopoles beams have individual phase shifters for total flexibility but four parallel banks of feed manifold are difficult to physically implement, particularly for microwave and millimeter wave frequency antenna. The sum beam is used for both receive and transmit while the difference beam is typically for receive only.

Figure 3:
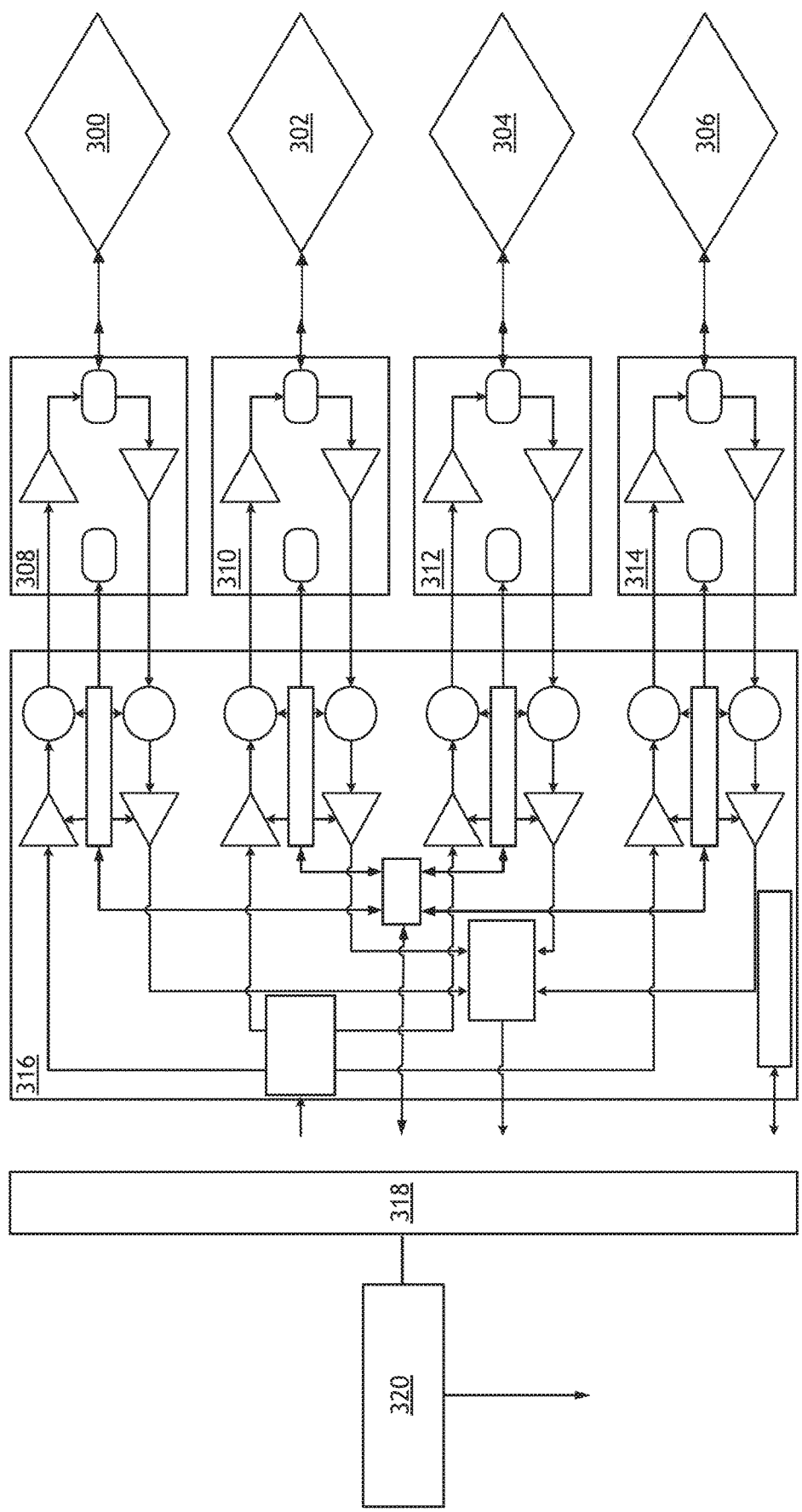
FIG. 3 shows a block diagram of a driving circuit for an electronically scanned array according to an exemplary embodiment.

Referring to FIG. 3, a block diagram of a driving circuit for an electronically scanned array according to an exemplary embodiment is shown. The array comprises a plurality of radiating elements 300, 302, 304, 306, each driven by a switchable transmitter/receiver module 308, 310, 312, 314. Each switchable transmitter/receiver module 308, 310, 312, 314 is controlled via an integrated circuit 316 which may be configured to apply signals to each switchable transmitter/receiver module 308, 310, 312, 314 to produce a desired, steerable beam via constructive and destructive interference. In at least one embodiment, where a single variable gain amplifier and/or attenuator is associated with each radiating element 300, 302, 304, 306, only a single amplitude tapering is available at any one time.

In at least one embodiment, the integrated circuit 316 receives signals to apply to the radiating elements 300, 302, 304, 306 from a subarray/aperture level feed manifold 318 which itself is in data communication with a transceiver 320. In at least one embodiment, integrated circuit 316 may be configured during a first signal pulse cycle to weight signals across the array of radiating elements 300, 302, 304, 306, producing a beam optimized via a split Taylor sum weighting for a sum analysis of the return signal, but sub-optimal difference analysis. Likewise, during a second signal pulse cycle, the integrated circuit 316 may be configured to weight signals across the array of radiating elements 300, 302, 304, 306, producing a beam optimized via a Bayless difference weighting for a delta azimuth and delta elevation analysis but sub-optimal sum analysis.

In at least on embodiment, the integrated circuit 300 is configured to transmit a first pulse having a Taylor sum weighting that forces nonoptimal Taylor difference weighted side lobe levels. The difference beam is realized by placing 180° phase shifts vertically and horizontally across the array quadrants without changing the amplitude tapering in any of the quadrants. Because the integrated circuit 300 is configured as a single channel feed manifold, amplitude weightings are constrained to a common set for both the sum and difference beams. Return signals are processed according a monopulse algorithm. If the received sum beam and difference beams are sufficient in terms of signal-to-noise and signal-to-clutter ratios, no further signals are needed.

If the signal-to-noise and signal-to-clutter ratios are insufficient, the integrated circuit configures the array for optimal elevation and azimuth difference beams, forcing a nonoptimal sum beam. A second beam is transmitted with nonoptimal transmit side lobe levels and optimum azimuthal and elevation side lobe levels. After monopulse processing, if the resultant sum beam and difference beams are good in in terms of signal-to-noise and signal-to-clutter ratios, no further steps are required. Otherwise, the set of sum and difference beams received from each pulse are processed together to use optimal components from pulse.

Pulse pair processing utilizes the optimal sum beam of the first pulse and the optimal azimuthal and elevation difference beams of the second pulse for monopulse processing, or vice versa. The same processing steps may be performed over multiple sets of pulses that may be coherently or incoherently integrated.

In at least one embodiment, a sum beam requires the best peak gain with low side lobes for radar clutter suppression. Taylor aperture weightings and similar filtering functions may be used to produce a sum beam. Phase is flat across the aperture at boresight and phase ramp is superimposed for beam steering. Alternatively, a difference beam requires a null at the center of the aperture and low side lobes for radar clutter suppression; low side lobes are generally preferred for clutter suppression in both sum beams and difference beams. Bayliss aperture weighting optimizes the null slope for a difference beam for a given design side lobe level. Phase is flat with a 180° phase step across the aperture at boresight; the resultant boresight excitation has both non-uniform amplitude and phase. A phase ramp may superimposed for beam steering. The sum beam is used both in transmit and receive modes. While in a receive mode, the sum beam, the delta elevation, and the delta azimuth beams are used. It may be appreciated that the sum beam and difference beams are non-optimum for either the transmit case or receive case at any one time due to the hardware constraint of having only one a single variable gain amplifier and/or attenuator for each radiating element.

The transceiver 320 receives return signals from each pulse cycle which a radar processing unit may post process according to an algorithm for three-channel monopulse return.

Figure 4:
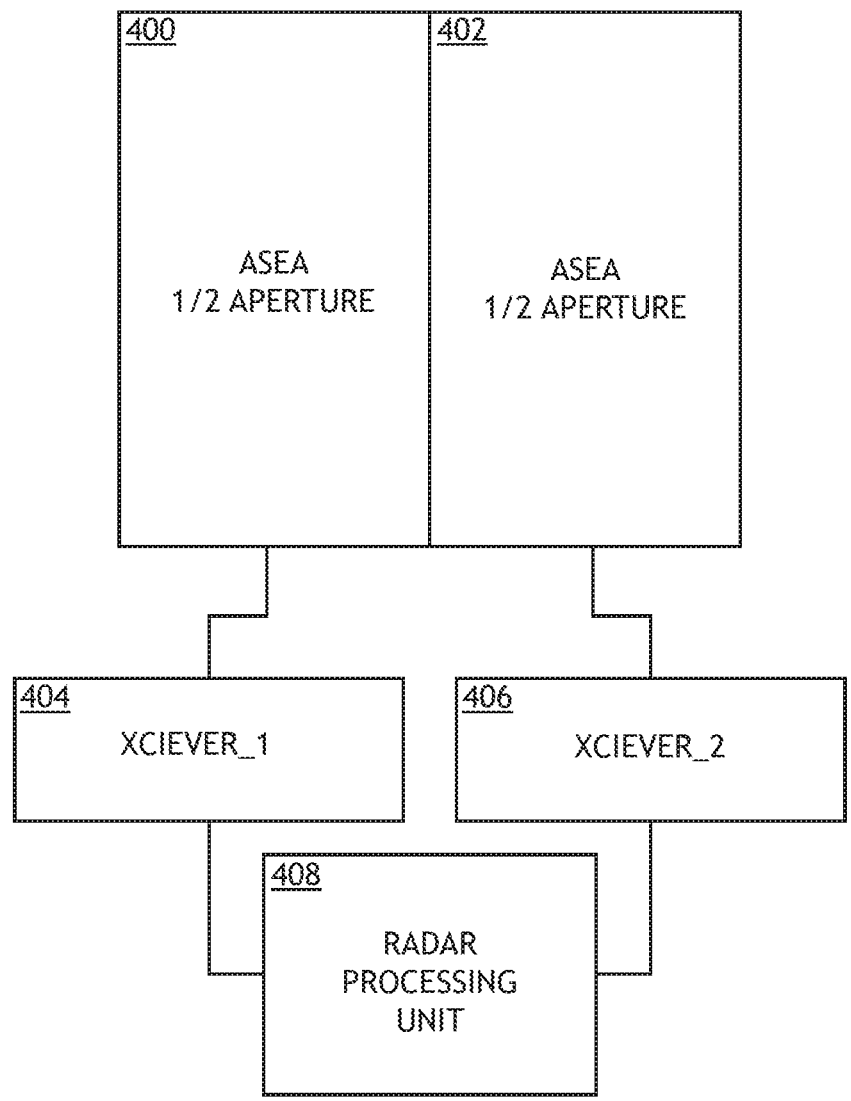
FIG. 4 shows a block diagram of a radar system according to an exemplary embodiment.

Referring to FIG. 4, a block diagram of a dual-aperture radar system according to an exemplary embodiment utilizing 1D monopulse architecture is shown. The radar system includes an array divided into two apertures 400, 402, each driven by corresponding drive circuitry and an associated transceiver 404, 406. A radar processing unit 408 determines and applies signals to each of the transceivers 404, 406 to configure each corresponding aperture 400, 402 to produces signals to configure the apertures 400, 402 to produce a combined signal that is the sum of each individual aperture signal during first pulse cycle; and the radar processing unit 408 produces signals to configure the apertures 400, 402 to produce a combined signal that is the difference signal of each individual aperture signal during a second pulse cycle. The radar processing unit 408 may then process the return signals simultaneously with respect to each other using a three-channel monopulse return algorithm.

Split dual-aperture beam forming traditionally utilizes mechanically steered slotted waveguide arrays that have two I/O ports, each driving ½ of the total aperture. A high-power switching network selects between full aperture, left ½ aperture only, or right % aperture only. The radar processing unit 408 processes multiple pulse returns in the three antenna modes to create a monopulse-like sharpened beam through digital processing. In at least one embodiment, the processing algorithm comprises a hybrid form of amplitude-based sequential lobing. The ½ aperture modes suffer from a significate signal to noise ratio reduction since the ½ modes have 6 dB less 2-way gain relative to the sum beam. The ½ aperture illumination function is sub-optional since the waveguide antenna is statically designed for low side lobe while operating in the full aperture mode. In at least one embodiment, all of the time multiplexed sum beam and difference beam processing is application to a dual-aperture architecture.

Figure 5:
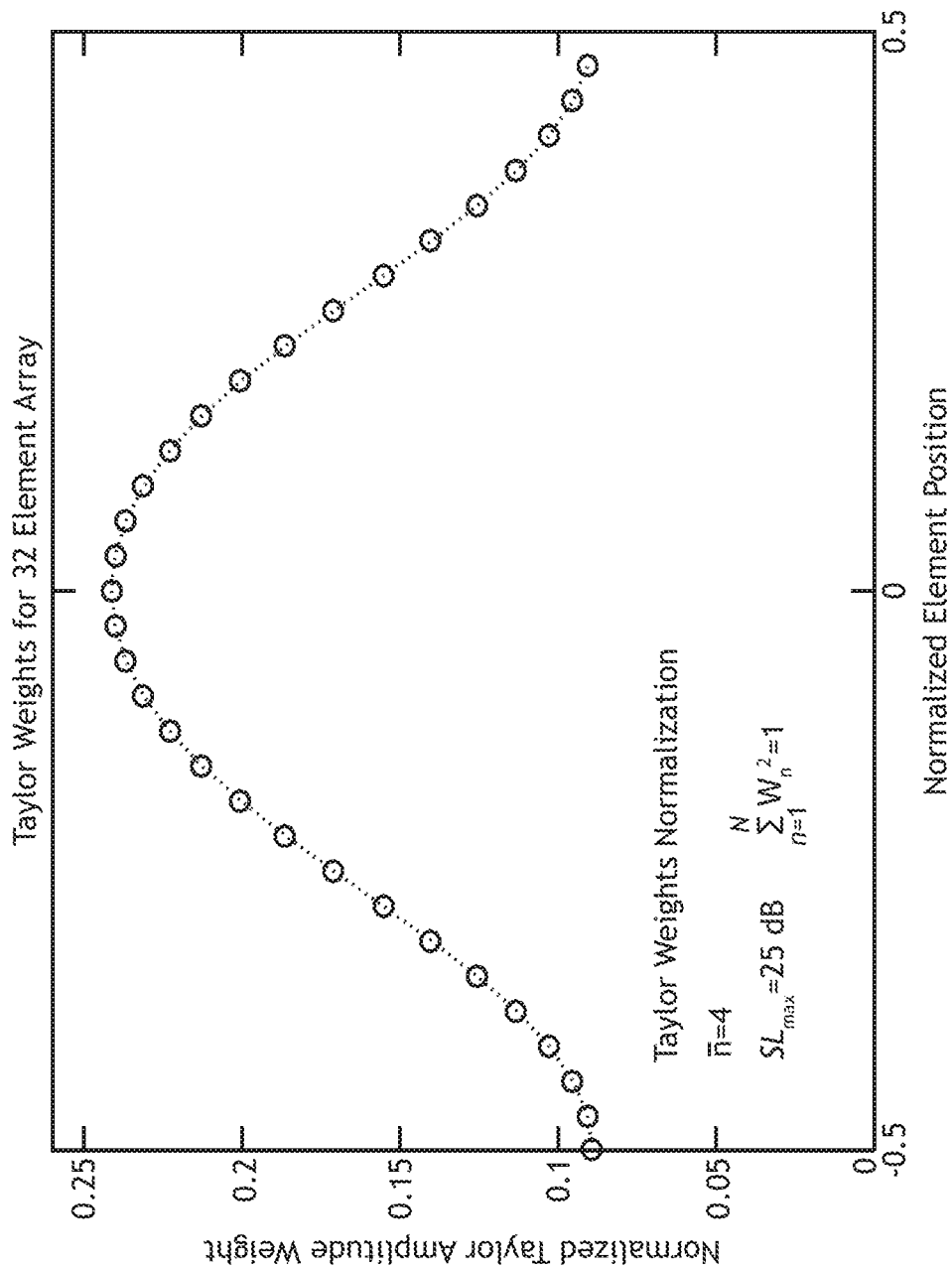
FIG. 5 shows a graphic representation of Taylor weightings across an electronically scanned array.

Referring to FIG. 5, a graphic representation of Taylor weightings across an electronically scanned array is shown. In at least one embodiment, when a radar processing unit is determining signals to produce a sum beam, the radar processing unit may apply Taylor weightings to signals to corresponding radiating elements in an active electronically scanned array. Taylor weightings with a dynamic range of 8.7 dB may reduce peak side lobe levels by 25 dB and produce a flat phase front for bore site beam position.

Figure 6:
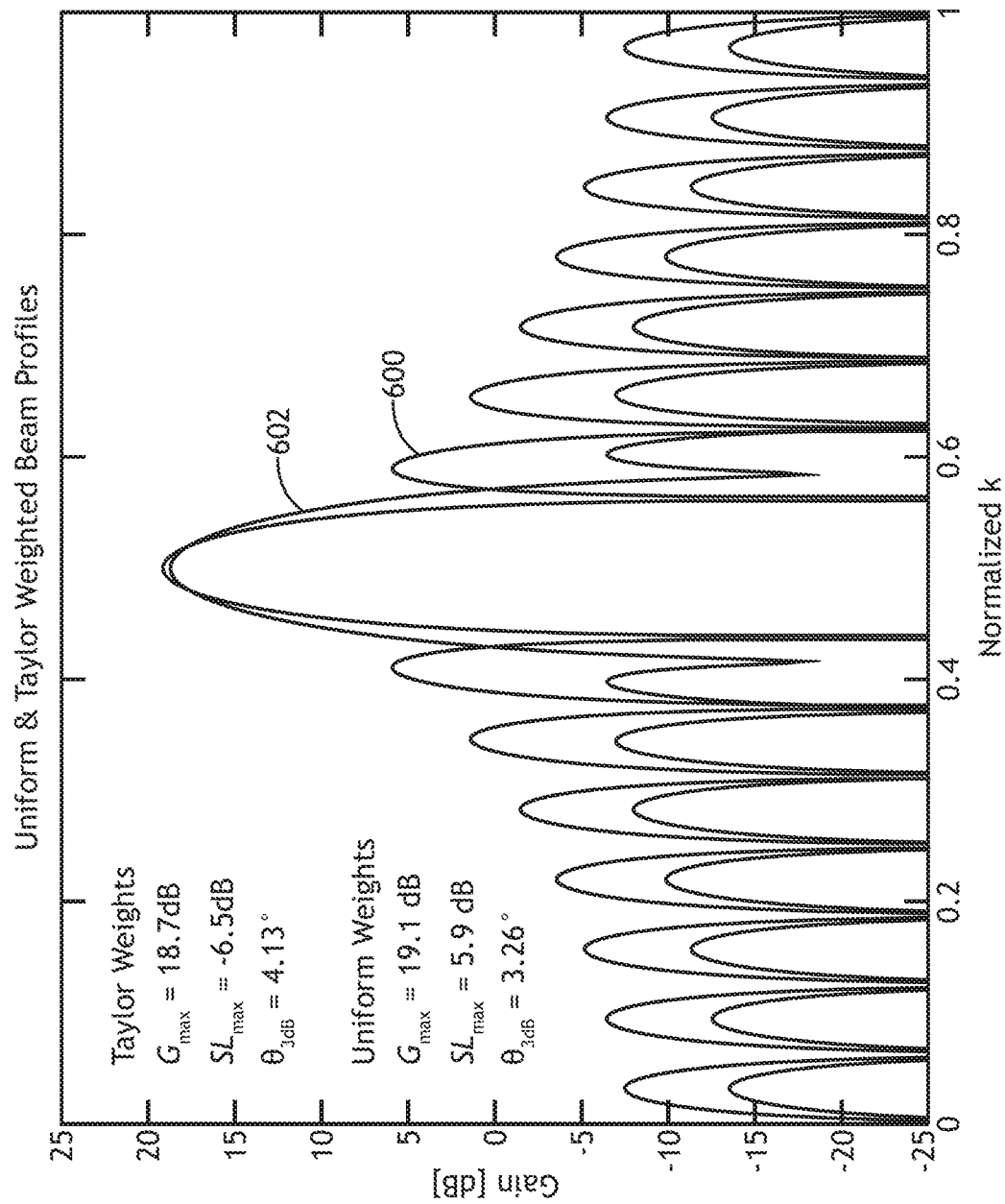
FIG. 6 shows a graphic representation of main and side lobes under Taylor weighting.

Referring to FIG. 6, a graphic representation of main and side lobes under Taylor weighting is shown. When producing a sum beam, an unweighted beam 600 may have a narrower main lobe, but also more intrusive side lobes. By comparison a Taylor weighted sum beam 602 may have suppressed side lobes. In one exemplary embodiment, where an unweighted beam 600 at an elevation angle of 30° has a maximum gain of approximately 30 dB, a Taylor weighted sum beam 602 may have peak gain reduced by 0.4 dB and peak side lobe levels reduced by approximately 12.4 dB.

Figure 7:
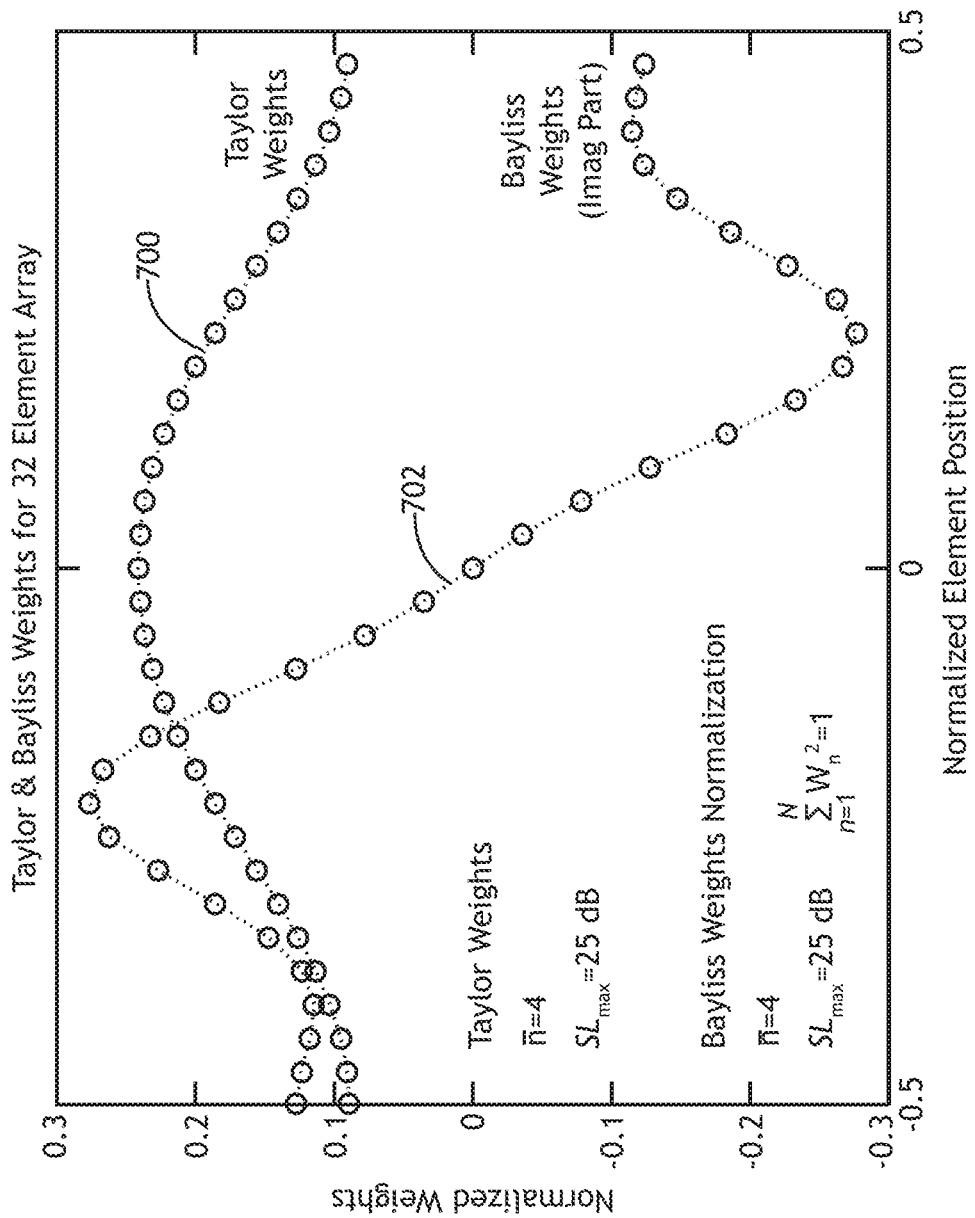
FIG. 7 shows a graphic representation of Taylor weightings and Bayliss weightings across an electronically scanned array.

Referring to FIG. 7, a graphic representation of Taylor weightings 700 and Bayliss weightings 702 across an electronically scanned array is shown. Taylor weighting 700 may produce peak side lobe levels 25 dB lower than an unweighted signal. The Taylor weightings 700 may have a dynamic range of 8 to 9 dB. It is not possible to simultaneously apply both the Bayliss and Taylor amplitude weightings at the same time in a single channel active electronically scanned antenna feed system using only one variable gain amplifier and/or attenuator for each radiating element.

In at least one embodiment, Bayliss weightings 702 may optimize null slope to a difference beam at a predetermined side lobe level design. In one exemplary embodiment, Bayliss weightings 702 with a 17 to 18 dB dynamic range may produce 20 dB side lobes with a signal sign change in the middle of the array.

Figure 8:
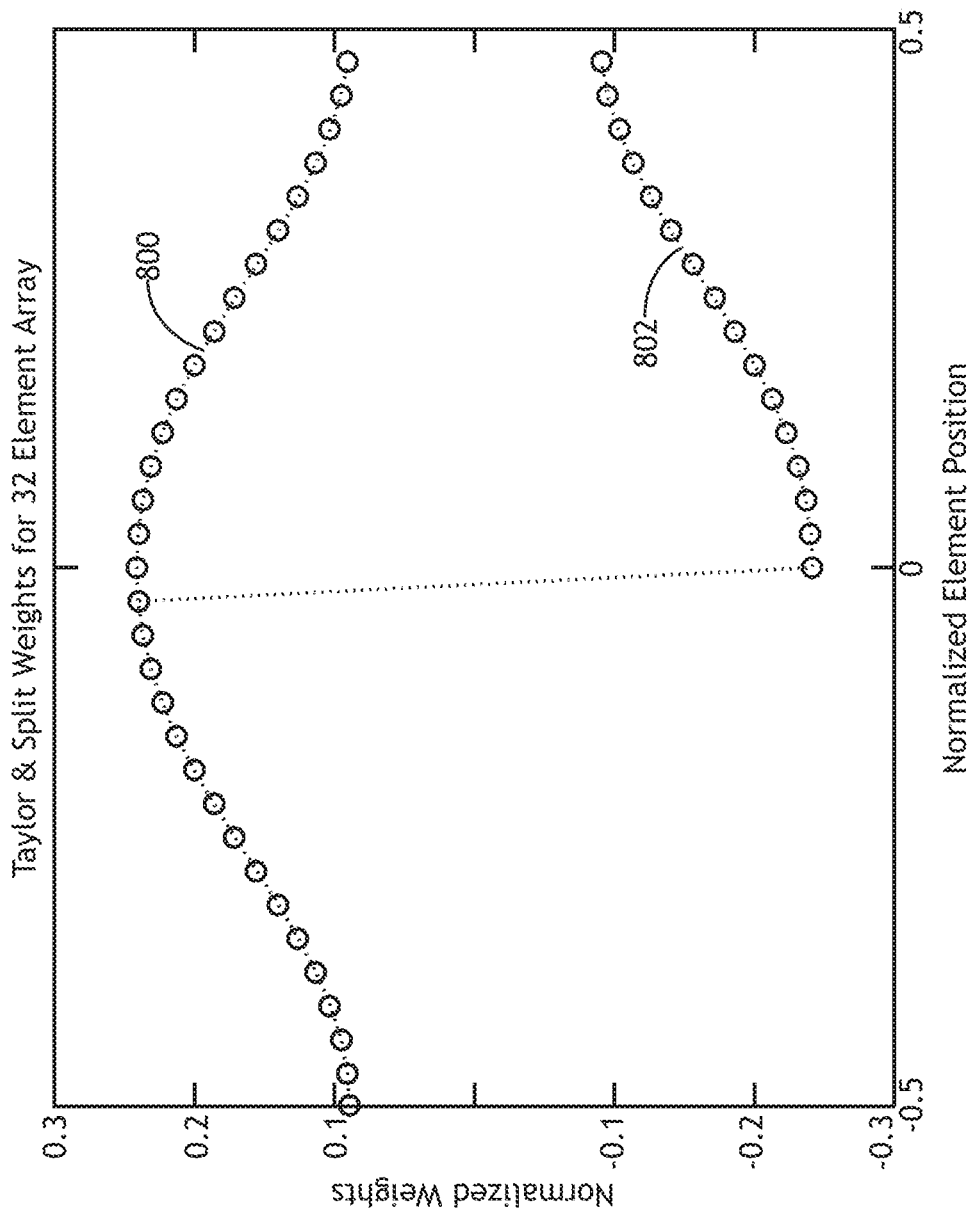
FIG. 8 shows a graphic representation of Taylor weightings and split Taylor weightings across an electronically scanned array.

Referring to FIG. 8, a graphic representation of Taylor weightings 800 and split Taylor weightings 802 across an electronically scanned array is shown. The split Taylor weighting 802 may be implemented via a 180° phase shift on a Taylor amplitude taper to produce a null for a difference beam. Such difference beam my produce peak side lobe levels 25 dB lower. Split Taylor weightings 802 may allow one weight per radiating element.

Figure 9:
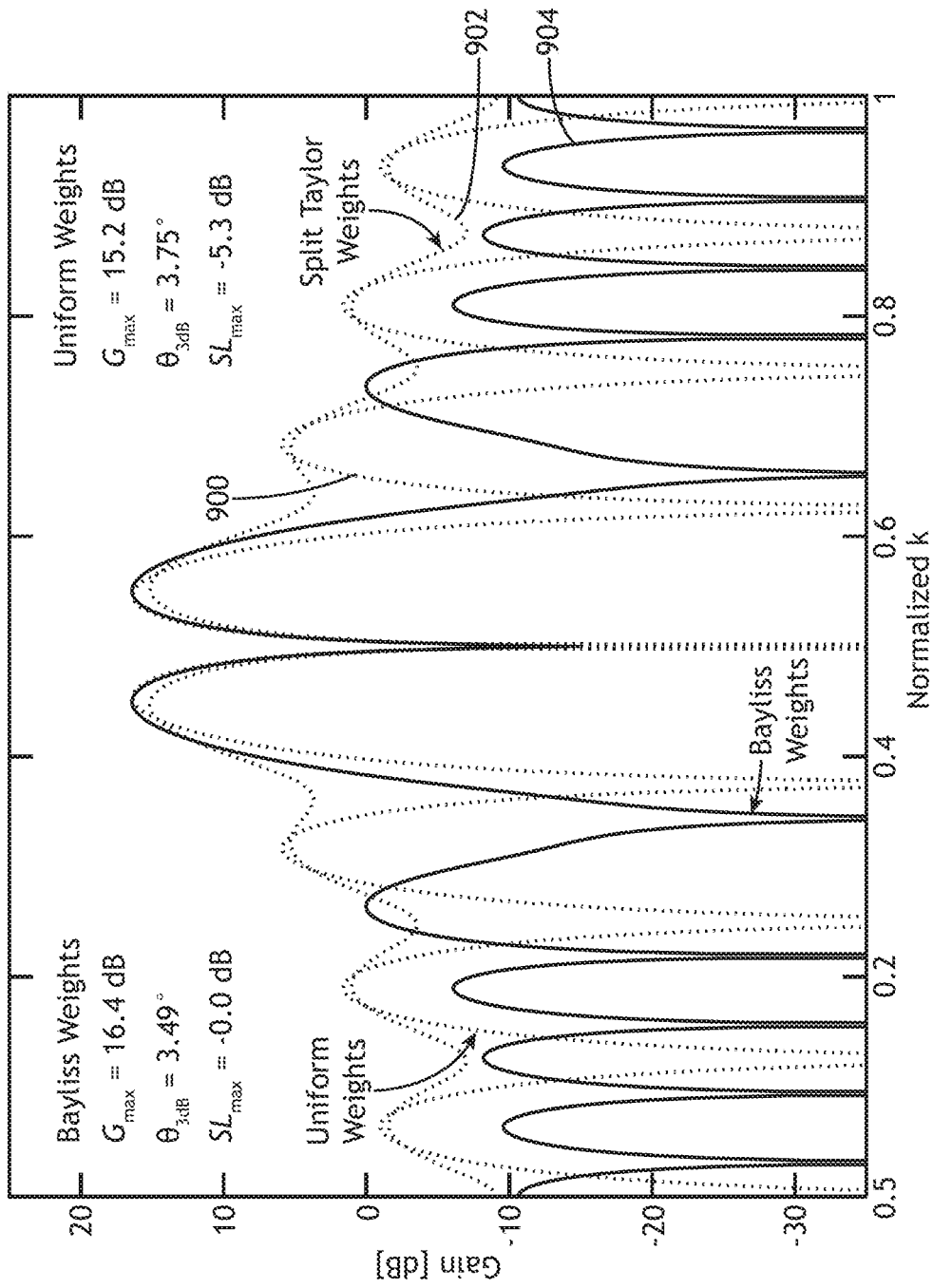
FIG. 9 shows a graphic representation of main and side lobes under split Taylor weighting and Bayliss weighting.

Referring to FIG. 9, a graphic representation of main and side lobes under split Taylor weighting and Bayliss weighting is shown. When producing a difference beam, an unweighted beam 900 may have distinct main and side lobe levels as compared to a split Taylor weighted beam 902 and a Bayliss weighted beam 904. The magnitude and distinction of sidelobes may be useful during post processing when comparing the difference beams 900, 902, 904 to sum beams using a three-channel monopulse process. In one exemplary embodiment, weightings may increase peak side lobe levels by 5.3 dB. At an elevation angle of approximately 30°, difference beams may have a maximum gain of approximately 20 dB. It may be appreciated that in some applications, a split Taylor weighted beam 902 may inferior peak side lobe levels as compared to an unweighted beam 900 and a Bayliss weighted beam 904. In one specific example, the Taylor sum weighting may be adjusted to be lower than −30 dB while the Bayliss difference beam may be adjusted to have similar low side lobe levels. Therefore, the side lobe ratio difference between the split Taylor or uniform delta beam excitation and the optimal Bayliss excitation can be on the order of 30 dB or more.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A radar system comprising:
a plurality of active electronically scanned arrays; and
at least one processor in data communication with a memory storing processor executable code for configuring the at least one processor to:
configure the active electronically scanned array via a single channel feed manifold to produce, via a sum split Taylor weighting algorithm by applying a 180° phase shift on a Taylor amplitude taper, a first transmit signal comprising a sum beam for processing via a sum analysis, but not difference beams for delta azimuth and delta elevation analysis;
receive a first return signal;
determine if the first return signal defines signal-to-noise and signal-to-clutter ratios within thresholds defined by a mission parameter.

2. The radar system of claim 1, wherein, determining that the first return signal defines signal-to-noise and signal-to-clutter ratios within thresholds defined by the mission parameter comprises performing a monopulse processing operation.

3. The radar system of claim 1, wherein, upon determining that the first return signal defines signal-to-noise and signal-to-clutter ratios within thresholds defined by the mission parameter, the at least one processor is further configured to:
configure the active electronically scanned array via the single channel feed manifold to produce, via a difference weighting algorithm, a second transmit signal comprising difference beams for delta azimuth and delta elevation analysis, but not for sum analysis;
receive a second return signal;
determine if the second return signal defines signal-to-noise and signal-to-clutter ratios within thresholds defined by a mission parameter.

4. The radar system of claim 3, wherein, determining that the second return signal defines signal-to-noise and signal-to-clutter ratios within thresholds defined by the mission parameter comprises performing a monopulse processing operation.

5. The radar system of claim 3, wherein, upon determining that the second return signal defines signal-to-noise and signal-to-clutter ratios outside thresholds defined by the mission parameters, the at least one processor is further configured to:
perform monopulse signal processing utilizing a sum beam component of the first return signal and a difference beam component of the second return signal.

6. The radar system of claim 5, wherein, the at least one processor is further configured to:
iteratively receive sets of return signals, each set comprising the first return signal and second return signal; and
integrate return signals from different iterative sets in a single monopulse processing step.

7. The radar system of claim 6, wherein the return signals are integrated coherently.

8. The radar system of claim 6, wherein the return signals are integrated incoherently.

9. A method of processing radar beams comprising:
configuring a quad-aperture active electronically scanned array via a single channel feed manifold to produce, via a sum split Taylor weighting algorithm by applying a 180° phase shift on a Taylor amplitude taper, a first transmit signal comprising a sum beam for processing via a sum analysis, but not difference beams for delta azimuth and delta elevation analysis;
receiving a first return signal;
performing a monopulse processing operation on the first return signal; and
determining if the first return signal defines signal-to-noise and signal-to-clutter ratios within thresholds defined by a mission parameter.

10. The method of claim 9, further comprising, upon determining that the first return signal is insufficient with respect to signal-to-noise and signal-to-clutter ratios:
configuring the quad-aperture active electronically scanned array via the single channel feed manifold to produce, via a difference weighting algorithm, a second transmit signal comprising difference beams for delta azimuth and delta elevation analysis, but not for sum analysis;
receiving a second return signal;
determining if the second return signal defines signal-to-noise and signal-to-clutter ratios within thresholds defined by a mission parameter.

11. The method of claim 10, wherein, determining that the second return signal defines signal-to-noise and signal-toclutter ratios within thresholds defined by the mission parameter comprises performing a monopulse processing operation.

12. The method of claim 10 further comprising, upon determining that the second return signal defines signal-to-noise and signal-to-clutter ratios outside thresholds defined by the mission parameters:

performing monopulse signal processing utilizing a sum beam component of the first return signal and a difference beam component of the second return signal.

13. The method of claim 12, further comprising:

iteratively receiving sets of return signals, each set comprising the first return signal and second return signal; and integrating return signals from different iterative sets in a single monopulse processing step.

14. The method of claim 13, wherein the return signals are integrated coherently.

15. The method of claim 13, wherein the return signals are integrated incoherently.

* * * * *